US008515980B2

(12) United States Patent
Mathieson et al.

(10) Patent No.: US 8,515,980 B2
(45) Date of Patent: Aug. 20, 2013

(54) METHOD AND SYSTEM FOR RANKING SEARCH RESULTS BASED ON CATEGORIES (75) Inventors: Michael Mathieson, Sunnyvale, CA (US); Sanjay Pundlkrao Ghatare, San Jose, CA (US); Vipul C. Dalal, Sunnyvale, CA (US); Sameep Navin Solanki, San Jose, CA (US); Muhammad Faisal Rehman, San Jose, CA (US)

(73) Assignee: eBay Inc., San Jose, CA (US)

( * ) Notice: Subject to any disclaimer, the term of this patent is extended or adjusted under 35 U.S.C. 154(b) by 176 days.

(21) Appl. No.: 12/838,307

(22) Filed: Jul. 16, 2010

(65) Prior Publication Data
US 2012/0016873 A1   Jan. 19, 2012

(51) Int. Cl.
G06F 7/00    (2006.01)
G06F 17/00   (2006.01)

(52) U.S. Cl.
USPC .......................................................... 707/758

(58) Field of Classification Search
USPC .......................................................... 707/758
See application file for complete search history.

(56) References Cited

U.S. PATENT DOCUMENTS 6,489,968 B1 * 12/2002 Ortega et al. ................. 715/713
6,606,619 B2 *  8/2003 Ortega et al. ........................ 1/1
7,519,581 B2 *  4/2009 Wang et al. ........................... 1/1
2003/0216930 A1 * 11/2003 Dunham et al. ................. 705/1
2005/0246332 A1 * 11/2005 Wang et al. ....................... 707/3
2006/0212817 A1 *  9/2006 Paek et al. ..................... 715/745
2007/0233671 A1 * 10/2007 Oztekin et al. .................... 707/5
2007/0239518 A1 * 10/2007 Chung et al. .................... 705/10
2009/0083222 A1 *  3/2009 Craswell et al. .................. 707/3
2010/0057566 A1 *  3/2010 Itzhak ......................... 705/14.53

OTHER PUBLICATIONS

"eBay BestMatchItemDetails API Users Guide". 2009-2010. http://developer.ebay.com/DevZone/best-match-item-details/Concepts/BestMatchItemDetailsAPIGuide.html. annotated pp. 1-7.*

* cited by examiner

Primary Examiner — Robert Beausoliel, Jr.
Assistant Examiner — Michael Pham
(74) Attorney, Agent, or Firm — Schwegman, Lundberg & Woessner, P.A.

(57) ABSTRACT

Described herein are methods and systems for promoting item listings that satisfy a query based on the item listings being assigned to certain categories that have, based on historical click data, exhibited high demand characteristics for the query. Consistent with some embodiments, a certain number of leaf-level categories are identified based on demand data for those categories, and the item listings assigned to those categories are promoted through a weighting factor derived in part based on the click probability score associated with the category. In some embodiments, certain sub-categories may be selected when the demand associated with the child categories of the sub-category is well balanced.

14 Claims, 8 Drawing Sheets

CATEGORY BOOST SCORE = (1 + (MAX/(MIN − 1)) x P

WHERE P = CLICK PROBABILITY SCORE

METHOD AND SYSTEM FOR RANKING SEARCH RESULTS BASED ON CATEGORIES

TECHNICAL FIELD

The present disclosure generally relates to data processing systems and techniques. More specifically, the present disclosure relates to methods and systems for ranking a set of search results, based in part on the categories to which an item associated with each search result (e.g., item listing) has been assigned.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come in to existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

For enterprises that serve as an intermediary—for example, by connecting buyers with sellers—it is generally desirable that the presentation of item listings occur in a fair manner that strikes a balance between the needs and desires of the various sellers, the buyers or potential buyers, and the enterprise itself. If a preference is given to one seller, such that the one seller's item listings are consistently being presented in the most prominent position(s) on a search results page, other sellers may not participate, which will ultimately have a negative impact on the enterprise. Similarly, if item listings are presented in accordance with an algorithm that is too rigid and that cannot easily be altered or tweaked, such as a first-listed first-presented algorithm, some sellers may attempt to game the system, again negatively impacting other sellers, the potential buyers' experience, and ultimately the enterprise itself. Furthermore, using a simple and rigid algorithm for presenting item listings prevents the enterprise from optimizing the presentation of item listings to improve the overall conversion rate for item listings. This may lead potential buyers to shop elsewhere, which ultimately will negatively affect the e-commerce enterprise. Finally, any algorithm used in the selection and ranking of search results for presentation to a user should accurately present the items for which a potential buyer is searching.

DESCRIPTION OF THE DRAWINGS

Some embodiments are illustrated by way of example and not limitation in the figures of the accompanying drawings, in which.

DETAILED DESCRIPTION

Methods and systems for ranking a set of search results, based in part on the categories to which an item associated with each search result has been assigned are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Figure 1:
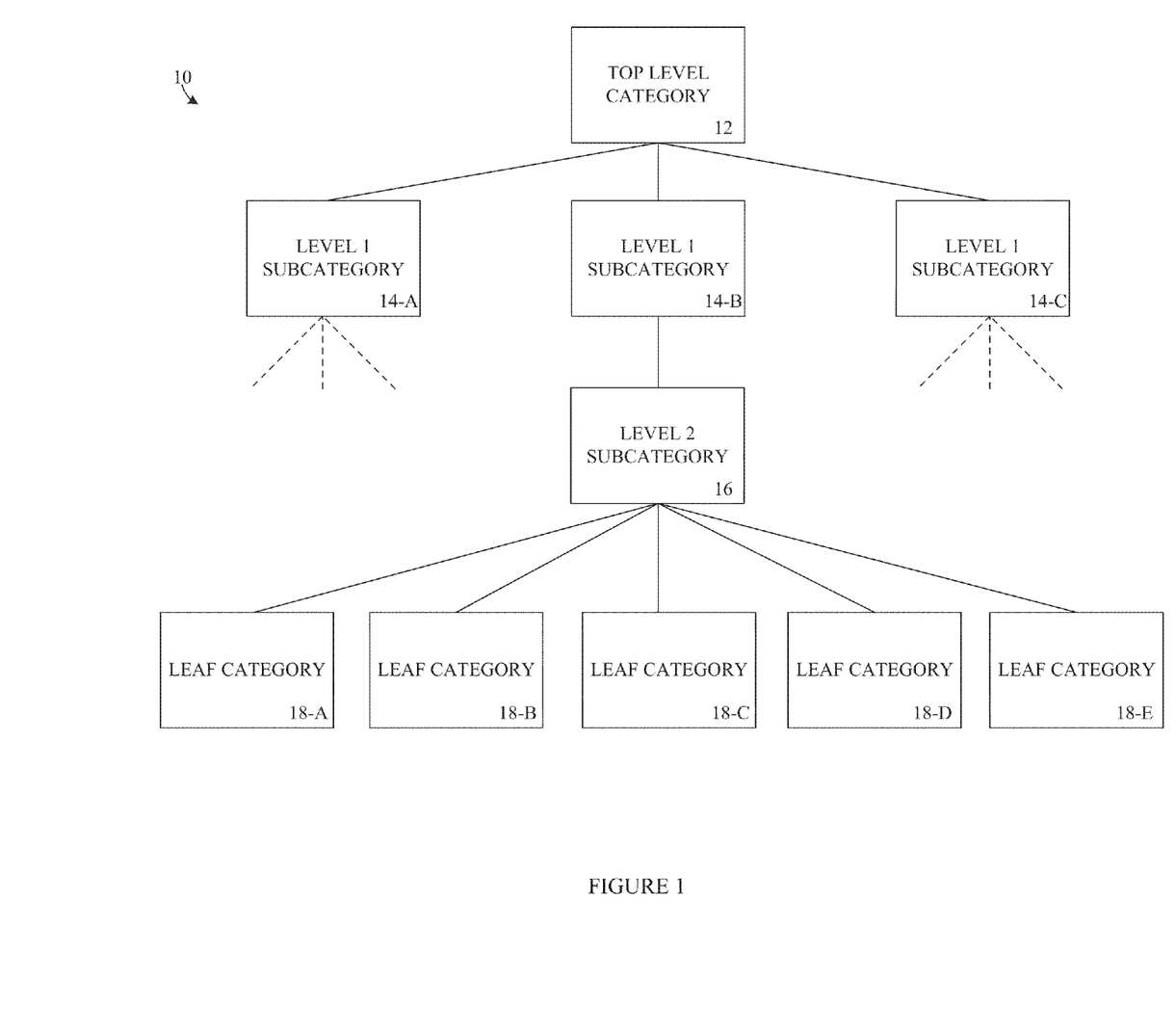
FIG. 1 illustrates an example of a tree-like hierarchy of categories for use with an on-line marketplace or trading application, consistent with some embodiments of the invention.

Consistent with some embodiments of the invention, an online e-commerce or trading platform facilitates transactions between buyers and sellers of goods and services. The trading platform enables a seller to generate an item listing describing the good or service being offered. When the item listing is first generated, the seller selects or otherwise designates a leaf-level category to which the item is assigned. For example, if the item is a portable music player, the seller may select the leaf-level category that best corresponds with portable media players. A leaf-level category is a sub-category of a tree-like hierarchy of categories that does not itself have any additional child sub-categories. For instance, FIG. 1 illustrates an example of a tree-like hierarchy of categories 10, consistent with some embodiments of the invention. As shown in FIG. 1, there is one top-level category 12, which has three direct Level 1 sub-categories 14-A, 14-B and 14-C. Although the tree-like structure 10 may have several top level categories and any number of intermediate level subcategories and leaf-level categories, for purposes of conveying an understanding of the inventive subject matter, the tree-like structure of FIG. 1 is shown to include only one top level category 12, three Level 1 sub-categories 14-A, 14-B and 14-C, one Level 2 subcategory 16 and five individual leaf-level categories 18-A, 18-B, 18-C, 18-D and 18-E.

Consistent with some embodiments of the invention, an online e-commerce or trading platform includes an item listing presentation management module that presents search results (e.g., item listings) in a search results page, such that the search results are ordered based on a ranking score assigned to each search result. The ranking score itself may have several component scores or factors, such that the ranking score for each search result (e.g., item listing) is calculated as the sum of the component scores, or in some cases the product of the various factors. In some embodiments, one component score or factor is a category boost score or factor that, for a particular query, increases the ranking score for item listings that have been assigned to certain sub-categories or leaf-level categories. For instance, if a user enters a particular search term, such as "16 GB iPod Touch", the item listings assigned to certain leaf-level categories are more likely to be selected from the search results page. Accordingly, for the particular search term or terms, the item listings associated with certain categories have their ranking scores boosted, or increased, by inclusion of a category boost score. Continuing with the example search term, "16 GB iPod Touch," item listings assigned to certain leaf-level categories, such as "MP3 Players," are more likely to be selected than item listings assigned to other categories, such as "Accessories." In contrast to some conventional search algorithms which boost or increase the ranking score for all item listings in the dominant top-level category, consistent with some embodiments of the invention, only item listings assigned to the most relevant sub-categories or leaf-level categories, as indicated by an analysis of historical click data, are given a boost or increase to their ranking scores, and thus presented more prominently in the search results page.

To identify the sub-categories or leaf-level categories that are most likely to be selected for a particular search term or terms, the e-commerce or online trading platform also includes a click tracking module that detects and stores certain events, such as when a user clicks on, or otherwise selects, a particular item listing associated with a leaf-level category from the search results page. For instance, after entering a particular search term or terms, and being presented with a list of search results in a search results page, a user may select a particular item listing to view additional detailed information about the item or service being offered via the item listing. The click tracking module detects the selection of the item listing and the category to which the item listing has been assigned, and associates the selection with the user-entered search terms. In this manner, a click score for each sub-category and leaf-level category is generated with historical click data on a per-query basis. When generating a search results page, this historical click data is analyzed to generate click probability scores for the various categories assigned to the item listings satisfying a user's query. A predetermined number of categories having click probability scores that exceed some predetermined number or level are then selected, and a category boost score or factor is generated for the item listings assigned to those categories. This category boost factor or score is then utilized in the algorithm to generate and assign an overall ranking score to each item listing satisfying the user's search query. Advantageously, this allows item listings that are most likely to be of interest to a potential buyer to be displayed prominently in the search results. Other aspects of the inventive subject matter will be readily apparent from the description of the figures that follows.

Figure 2:
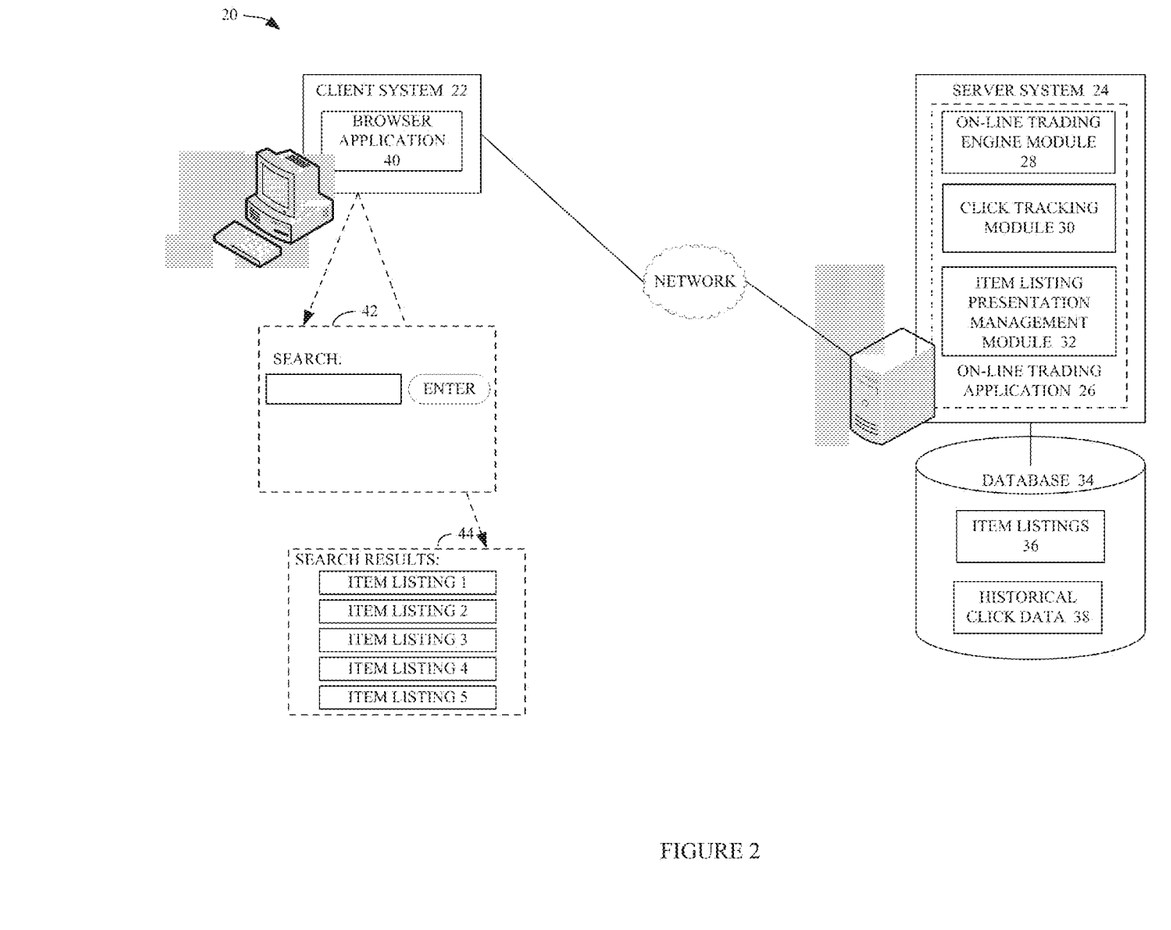
FIG. 2 illustrates a functional block diagram of a network environment for hosting an on-line marketplace or trading application, with which an embodiment of the invention might be implemented.

FIG. 2 illustrates a functional block diagram of a network environment 20 for hosting an on-line marketplace or trading application, with which an embodiment of the invention might be implemented. In general, the network environment 20 of FIG. 2 includes a client system 22 and a server-based system 24 hosting an on-line trading application 26. As illustrated in FIG. 2, the on-line trading application 26 hosted at the server system 24 is shown to include an on-line trading engine module 28, a click tracking module 30 and an item listing presentation management module 32. Additionally, the on-line trading application is coupled to a database 34 with tables pertaining to item listings 36 and historical click data 38, in addition to other data.

In some embodiments, the on-line trading engine module 28 may consist of a variety of sub-components or modules, which provide some of the functions of an on-line trading application 26. As described more completely below, each module may be comprised of software instructions, computer hardware components, or a combination of both. To avoid obscuring the invention in unnecessary detail, only a few of the on-line trading engine functions (germane to the invention) are described herein. For example, the on-line trading engine module 28 may include an item listing management module (not shown) that facilitates the receiving and storing of data representing item attributes, which collectively form an item listing. When a user desires to list a single item, or multiple items, for sale, the user will provide information about the item(s) (e.g., item attributes) and how such items are to be presented for sale (e.g., at a fixed price, or via auction, etc.). Such information may be submitted via one or more forms of one or more web pages, or via drop down lists, or similar user interface elements. The item listing management module receives the item attributes and stores the item attributes together within a database 34 as an item listing 36. In some instances, the item listings may be stored in an item listing database table. In general, the item attributes of each item listing are analyzed to determine a ranking score assigned to item listings and used in determining the position of item listings when the item listings are being presented in a search results page.

When an item listing is first generated, the seller of the item will be prompted to assign the item and/or item listing to a particular category. For example, the user may be presented first with a list of top-level categories from which to select the best top-level category for his or her item. Upon selecting a top-level category, the seller may be presented with a list of Level 1 sub-categories from which to select, until the seller has navigated the hierarchical category tree and "drilled down" to select the best leaf-level category for the item being presented via the item listing. In general, the selected category allows potential buyers to identify items by category, for instance, by filtering search results by category, or, by searching or browsing for item listings assigned to a particular category, thereby generally making it easier to identify item listings of interest.

The click tracking module 30 operates to identify certain user-initiated events and activities. For instance, the click tracking module 30 identifies when a user "clicks" or otherwise selects an item listing assigned to a particular category. In some embodiments, a selection is identified when a potential buyer clicks on an item listing, or manipulates a cursor device to hover over a particular item listing. If, for example, a potential buyer performs a search with the search terms, "iPod touch", the click tracking module will identify which item listings in the search results page that the potential buyer selects for viewing—such event referred to generally as a "view item" event. The click tracking module 30 will identify the leaf-level category to which a selected item listing is assigned, and keep a tally of the number of times an item listing from each leaf-level category is selected for a particular search query, over a particular time frame. This click data is then stored in a database as illustrated in FIG. 2 by the historical click data with reference number 38. Accordingly, for each subsequent search query that is performed with the same search terms, a click probability score for each category can be ascertained from the historical click data 38. The click probability score for a category indicates the likelihood that an item listing assigned to that category will be selected for that particular search query, based on an analysis of historical click data. As described in greater detail below, the click probability score for the corresponding category to which an item listing is assigned is used to determine whether an item listing should be promoted, for instance, by applying a category boost factor in the algorithm used to assign the item listing a ranking score. The resulting increase in the ranking score will affect the item listing's position in the search results page, thereby "surfacing" the search results that are most likely to be of interest to a potential buyer, given the search term or terms entered by the potential buyer.

Referring again to FIG. 2, the on-line trading application 26 includes an item listing presentation management module 32. The item listing presentation management module 32 provides the logic used to assign a ranking score to item listings that satisfy a search query, and to use the ranking score to determine the order of item listings when the item listings are presented in a search results page. For instance, in some embodiments, a user operates a web browser application 40 on a client system 22 to interact with the on-line trading application 26 residing and executing on the server system 24. As illustrated by the example user interface with reference number 40, a user may be presented with a search interface, with which the user can specify one or more search terms to be used in a search request submitted to the on-line trading application 26. In some embodiments, in addition to specifying search terms, users may be able to select certain item attributes, such as the desired color of an item to be searched, and so on. Additionally, in some embodiments, a user may be able to browse items listings by navigating the tree-like hierarchy of categories. In any case, after receiving and processing a search request or category selection (for browsing), the on-line trading application 26 communicates a response to the web browser application 40 on the client system 12. For instance, the response is an Internet document or web page that, when rendered by the browser application 40, displays a search results page 44 showing several item listings that satisfy the user's search request. As illustrated in the example search results page 44 of FIG. 2, the item listings are arranged or positioned on the search results page in an order determined by the item listing presentation management module 32. The item listings are, in some embodiments, presented by a presentation module, which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in some manner other than a top-down list.

Figure 6:
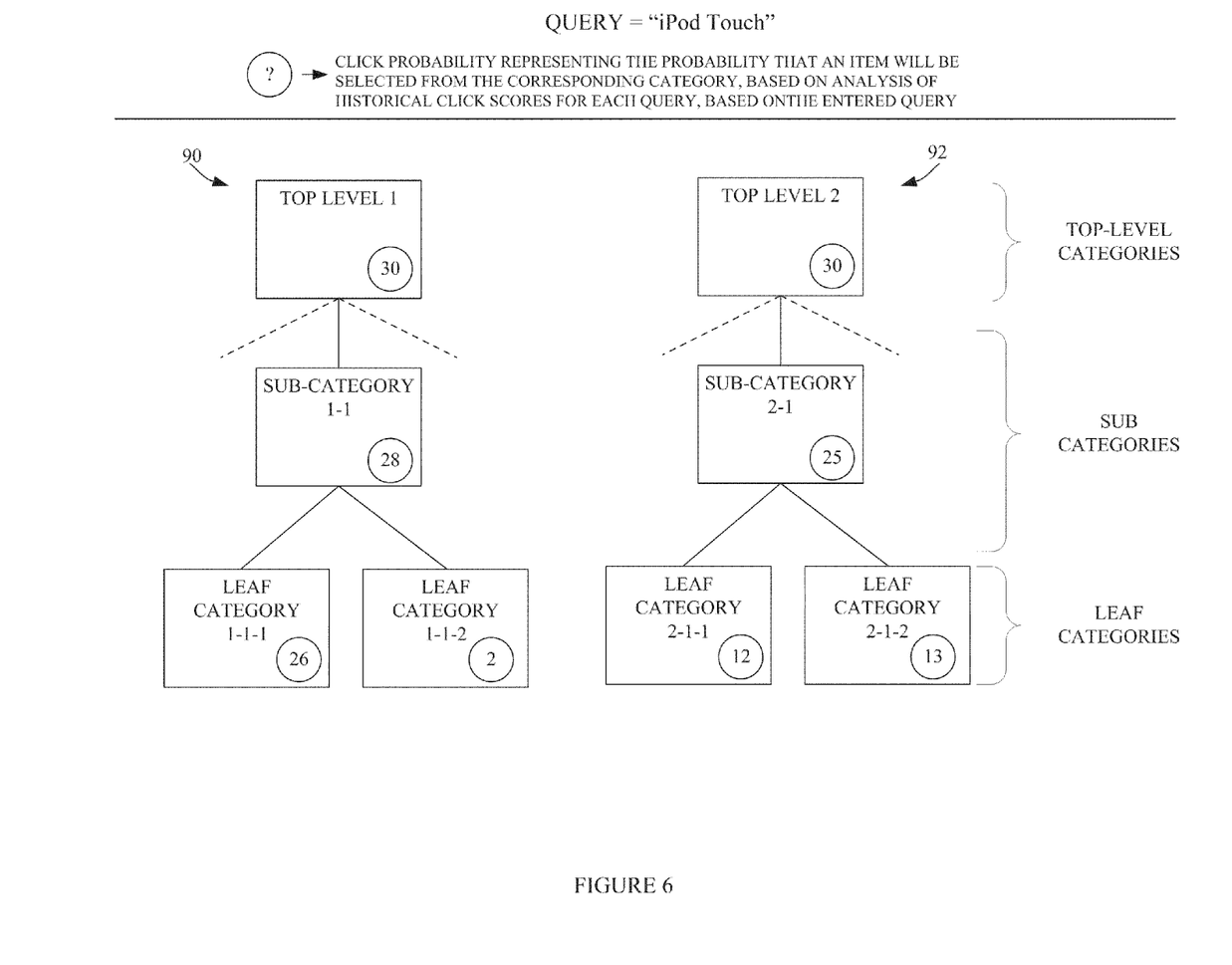
FIG. 6 illustrates an example tree-like hierarchical category structure consistent with embodiments of the invention.
Figure 7:
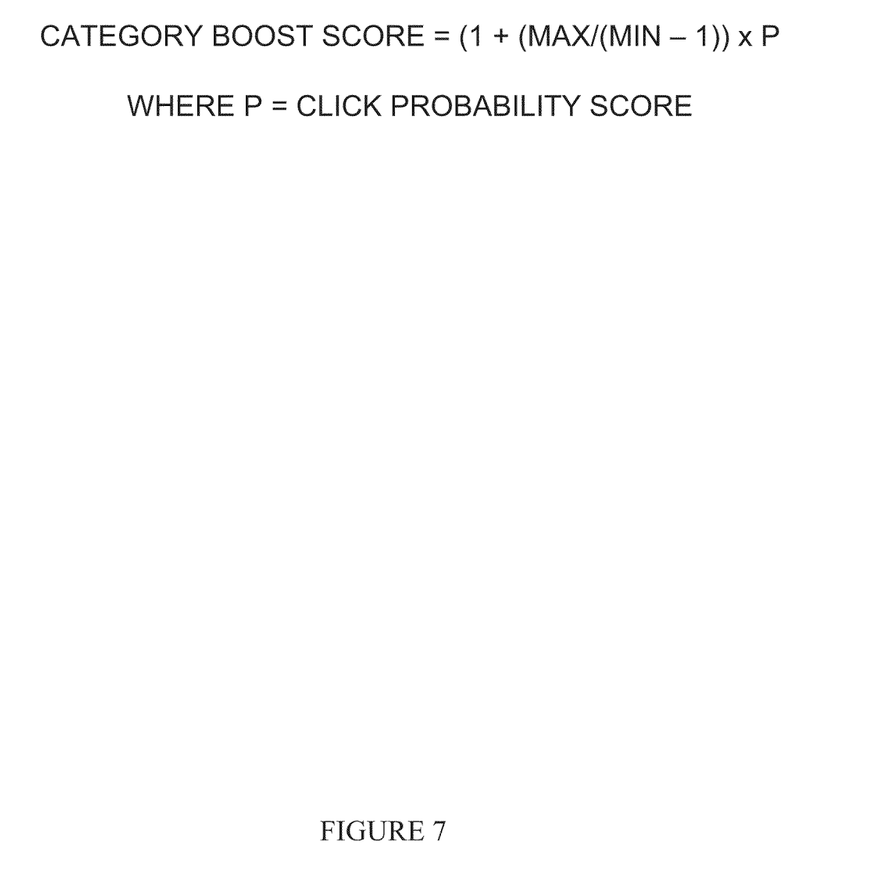
FIG. 7 illustrates an example formula for deriving a category boost score for item listings assigned to certain categories, based on the click probability score of the category, according to an embodiment of the invention.

Consistent with embodiments of the invention, the ranking score assigned to each item listing is based on one or more component scores or factors, including a category boost score that reflects a likelihood that some item listings assigned to certain categories are likely to be selected, based on an analysis of historical click data. Methods for identifying a predetermined number of categories from which item listings are likely to be selected based on a particular query are described in connection with the descriptions of FIGS. 4, 5 and 6. A method for deriving a factor (e.g., category boost score) based on the click probability score of a category is illustrated in FIG. 7, and explained in connection with the description thereof.

Figure 3:
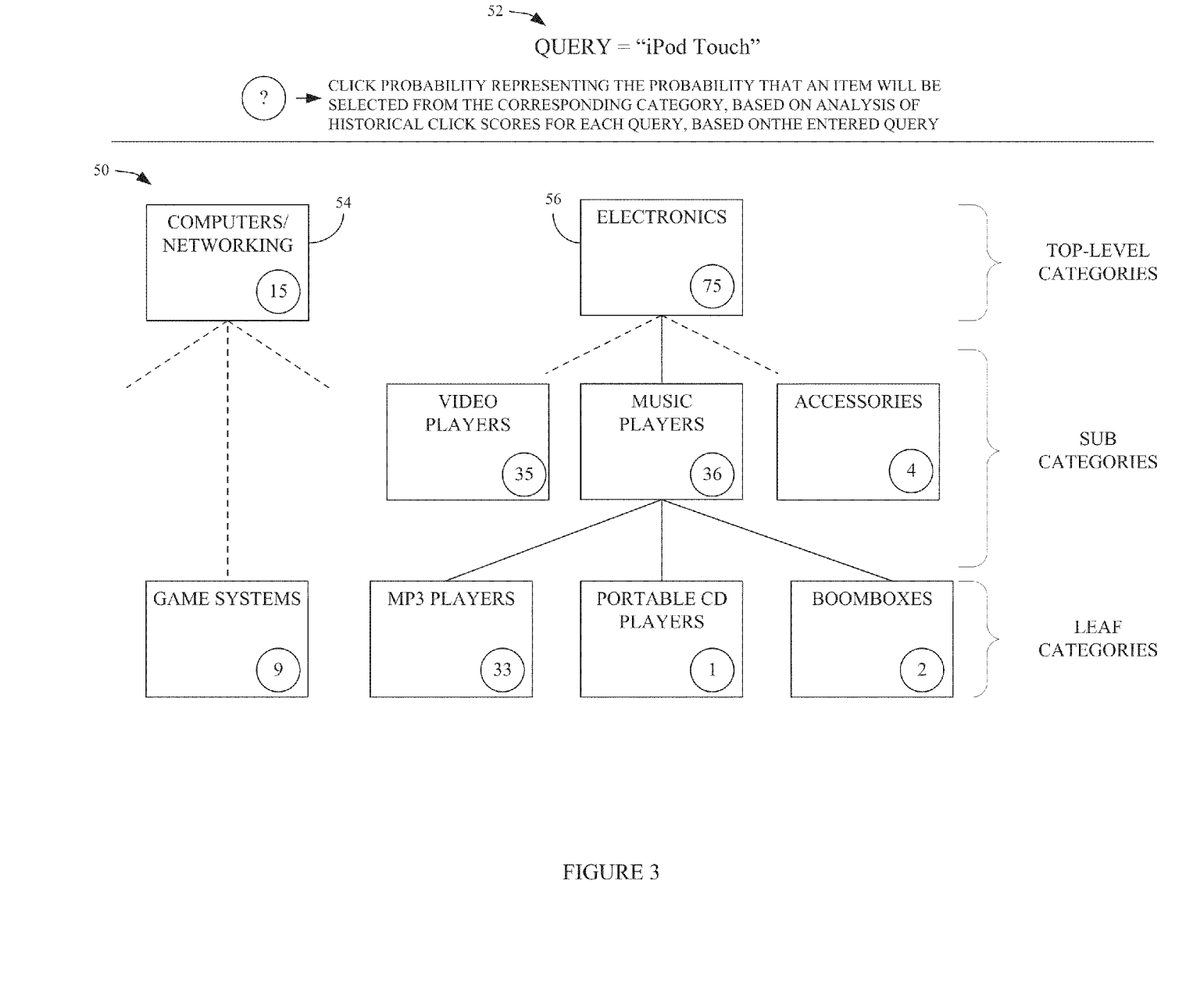
FIG. 3 illustrates an example of a tree-like hierarchy of categories for use with an e-commerce or trading application, and includes for each category a click probability score for a given query, consistent with some embodiments of the invention.

FIG. 3 illustrates an example of a hierarchical tree-like category structure 50 with click probability scores for a particular query 52, consistent with some embodiments of the invention. The hierarchical tree-like structure 50 represents an example of a category structure for use with an online trading or ecommerce platform. As illustrated in FIG. 3, the hierarchical tree-like structure 50 shows categories to which item listings are assigned, and the categories are shown with their corresponding click probability scores for the user-entered query, "iPod Touch." In the example of FIG. 3, not every category to which a click probability score has been assigned is shown. In this example, two top-level categories are shown—"Computers/Networking" 54 and "Electronics" 56. The numbers enclosed in circles represent the click probability scores for the corresponding categories for the particular search query—"iPod Touch." The click probability scores are derived by analyzing historical click data detected and captured via the click tracking module. Accordingly, in the example of FIG. 3, based on historical click data, the probability that a user will select an item listing associated with the leaf-level category "MP3 Players" is thirty-three percent, as compared with the one percent probability that the user will select an item listing in the leaf-level category "Portable CD Players."

In some embodiments, the click tracking module stores raw data, such that the click probability scores need to be computed, in real time when processing a query or when a user is browsing item listings by category. Computing the click probability scores involves dividing the number of clicks (or, events) for a particular category by the total number of all clicks (or, events) for all categories, for the particular query. In some embodiments, the click probability scores are pre-computed on a periodic basis.

In some conventional ranking algorithms, only the top-level category is considered when attempting to identify the most relevant item listings for a given query. However, by selecting item listings in the dominant top-level category (e.g., in this case, "Electronics"), many item listings assigned to leaf-level categories that are not particularly relevant in light of the search terms will be included in the search results. For instance, referring to FIG. 3, for the query, "iPod Touch", presenting in the search results page item listings generally selected from the top-level category, "Electronics," would result in including item listings assigned to leaf-level categories that are typically not relevant—such as, item listings assigned to leaf-level categories, "Portable CD Players" and "Boomboxes." If it turns out that the number of item listings assigned to one of these irrelevant leaf-level categories is significantly greater than the number of item listings in a relevant category, the overall mix of search results is likely to include a significant number of item listings that are not likely to be relevant and thus not likely to be selected by a potential buyer who is viewing the search results. As such, consistent with some embodiments of the invention, the item listings that are assigned to a predetermined number of sub-categories, or leaf-level categories, with the highest click probably score are given a boost to their ranking score by including a category boost factor or score in the algorithm used to assign each item listing a ranking score.

Figure 4:
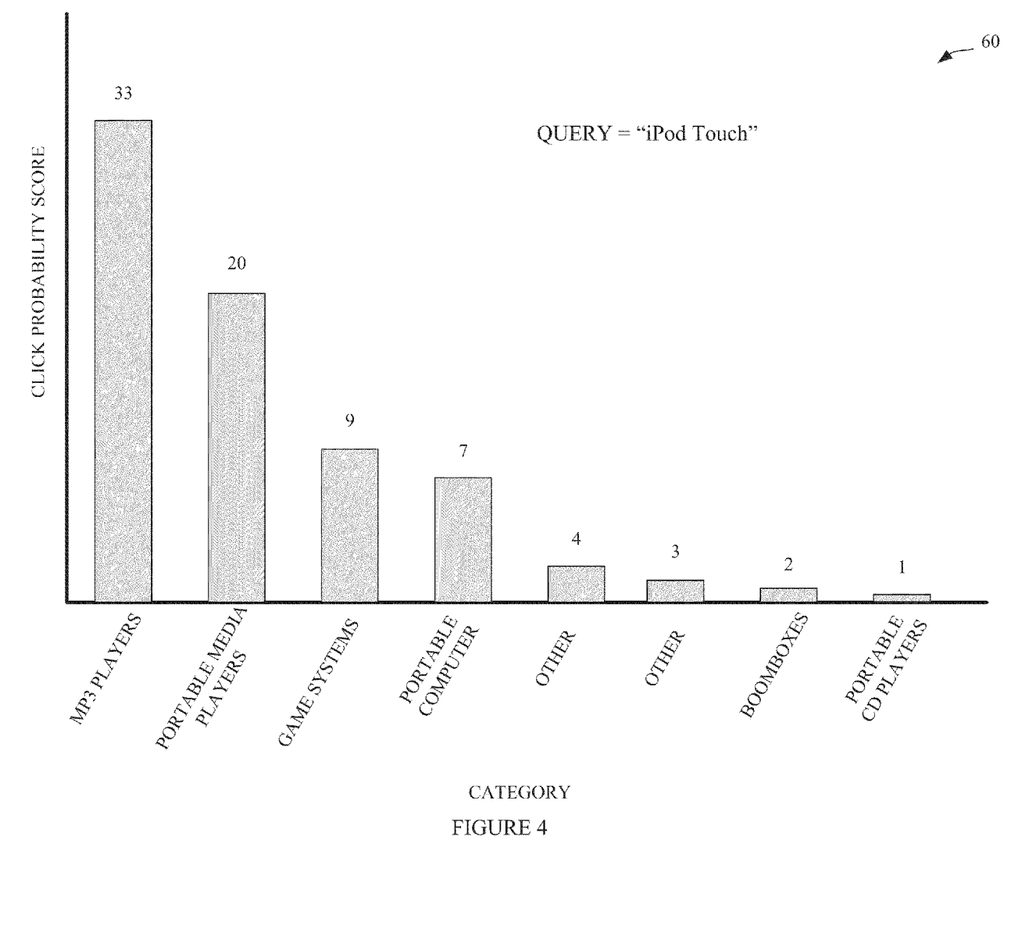
FIG. 4 illustrates the method operations for a method of processing a query and assigning to the search results of the query a category boost score that effects the position of each item listing in the search results page, according to an embodiment of the invention.

FIG. 4 illustrates an example bar chart 60 showing the click probability scores for several categories, for the query, "iPod Touch", consistent with some embodiments of the invention. The click probability scores shown in the bar chart of FIG. 4 are generally consistent with the click probability scores assigned to the categories in the tree-like hierarchy shown in FIG. 3. Accordingly, the category "MP3 PLAYERS" has the highest click probability score for the query "iPod Touch", with a score of thirty-three. The next highest click probability score is associated with the leaf-level category, "PORTABLE MEDIA PLAYERS." Consistent with embodiments of the invention, when item listings are presented to a potential buyer, item listings in a certain predetermined number of categories with high click probability scores are promoted by including in the ranking algorithm a category boost factor.

Figure 5:
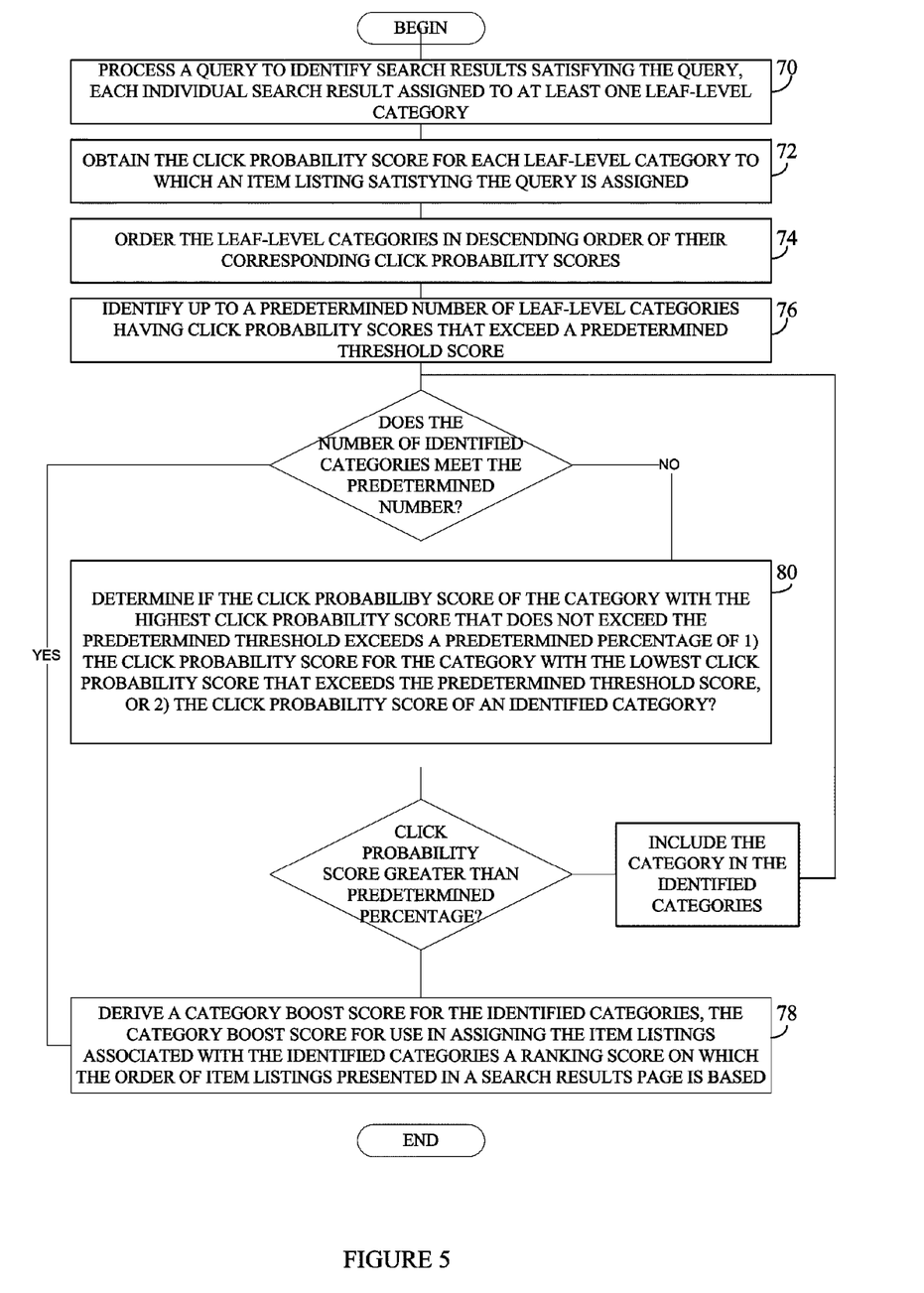
FIG. 5 illustrates the method operations for a method to determine the item listings that should be promoted for a given query, based on those item listings being assigned to certain leaf-level categories, which, based on an analysis of historical click data, are likely to be associated with item listings that will be selected for viewing for a given query, according to an embodiment of the invention.

FIG. 5 illustrates the method operations for a method to determine the item listings that should be promoted for a given query, based on those item listings being assigned to certain leaf-level categories, which, based on an analysis of historical click data, are likely to be associated with item listings that will be selected for viewing for a given query, according to an embodiment of the invention. The method begins at method operation 70, when a user (e.g., potential buyer) submits a search term or terms for use in a query. The query is process to identify a set of item listings that satisfy the search terms, where each item listing in the set is assigned to at least one leaf-level category. Next, at method operation 72, the click probability scores are determined for each leaf-level category to which an item listing satisfying the query is assigned. For example, for each leaf-level category to which an item listing satisfying the query has been assigned, the click probability score is derived. In some embodiments, the click probability scores may be pre-computed on a periodic basis, such that they need only be recalled. In other embodiments, the click probability scores may be calculated in real-time during the processing of a query, or as a user browses item listings by category. In general, the click probability score for a category is derived by dividing the total clicks (or, events) for the category by the total number of clicks (or, events) for all categories under consideration. Once the click probability scores for each leaf-level category are derived, the leaf-level categories are ordered in descending order based on their respective click probability scores at method operation 74.

Once the leaf-level categories are in order based on their respective click probability scores, a predetermined number of leaf-level categories having click probability scores exceeding some predetermined threshold score are identified at method operation 76. For example, in some embodiments, the predetermined number of leaf-level categories to be identified will vary based on the query, or, based on the known dominant categories, or some other factor. In some embodiments, the predetermined threshold score that a click probability score must meet or exceed in order to be included in the list of identified categories and have their associated item listings promoted is a derived value. For example, in some embodiments, the predetermined threshold is derived by dividing the click probability score of the leaf-level category with the highest click probability score by one less than the predetermined number of leaf-level categories to be identified. If, for example, the predetermined number of categories to be identified is five (5), then, using the example presented in FIG. 4, the threshold score would be eight and one quarter (8.25), the result of thirty three (33–the click probability score for MP3 PLAYERS) divided by five (the predetermined number of leaf-level categories to be identified) minus one (5–1). In alternative embodiments, the threshold score may be fixed, or may be derived using any number of alternative algorithms.

If the number of leaf-level categories having click probability scores that meet or exceed the threshold score is equal to or greater than the predetermined number of leaf-level categories to be identified, then the predetermined number of leaf level categories with the highest click probability scores are included in the list of categories that are to have their respective item listings promoted with a category boost score. Accordingly, at method operation 78, category boost scores for the item listings assigned to the identified categories are derived for use in an algorithm for determining a ranking score for each item listing that satisfied the query. However, if the number of leaf-level categories having click probability scores exceeding the threshold score is less than the predetermined number, a separate analysis is performed to determine whether to include additional leaf-level categories as identified leaf-level categories qualifying for category boost scores. For example, at method operation 80, analysis is performed to determine if the click probability score of the leaf-level category with the highest click probability score that does not meet or exceed the threshold score is within a certain predefined percentage of the click probability score for the leaf-level category with the lowest click probability score that meets or exceeds the threshold score. If the click probability score of the leaf-level category with the highest click probability score that does not meet or exceed the threshold score is within a certain percentage of the click probability score of the leaf-level category with the lowest click probability score that exceeds the threshold score, then that leaf-level category is included as an identified leaf level category. This process is then repeated until the number of identified leaf-level categories is equivalent to the predetermined number of leaf-level categories to be identified, or until the click probability score of the leaf-level category with the highest click probability score does not meet the specified criteria for inclusion as an identified leaf-level category.

Referring again to FIG. 4, an example will now be provided. Assuming that the predetermined number of leaf-level categories to be identified is set to three (3), then the threshold score might be calculated as thirty-three (33–the click probability score for MP3 PLAYERS) divided by two (one less than the predetermined number, or 3−1). This means, in this example, the threshold score is sixteen and one half. Consequently, because the click probability scores for the first two leaf-level categories (i.e., MP3 PLAYERS and PORTABLE MEDIA PLAYERS) exceed the threshold score (16.5), these first two leaf-level categories will automatically be included in the group of identified leaf-level categories, and their associated item listings will qualify for a promotion via a category boost score. However, the click probability score for the leaf-level category "GAME SYSTEMS" is nine (9) and therefore does not meet or exceed the threshold score (16.5). Assuming that the predetermined percentage is set to forty percent, such that a leaf-level category will be included as an identified category if its click probability score meets or exceeds forty percent of the click probability score of the leaf-level category with the lowest click probability score that exceeds the threshold score, then the leaf-level category GAME SYSTEMS will round out the identified categories because its click probability score (9) exceeds eight (8), which is forty percent of twenty–the click probability score for the leaf-level category "PORTABLE MEDIA PLAYERS." If, however, the predetermined percentage is set to fifty percent (50%), then the number of identified leaf-level categories will be two, as the click probability score for the leaf-level category, "GAME SYSTEMS" does not meet or exceed ten, which is fifty percent of twenty–the click probability score for "PORTABLE MEDIA PLAYERS."

Consistent with some embodiments, instead of exclusively selecting leaf-level categories, certain sub-categories are selected where the particular sub-category exhibits "pockets of concentration" of demand, as measured by the click probability score for the sub-category and certain other characteristics. For example, in some embodiments, the analysis involves identifying sub-categories that includes a number of child, leaf-level categories that does not exceed the predetermined number of categories to be identified for promotion with a category boost score. In addition, the distribution of the demand amongst the child leaf-level categories may be considered, such that a sub-category and all of its child categories may be selected for inclusion in the list of categories with items to be promoted only when the difference between the click probability scores for any two sub-categories at a certain level in the tree does not exceed some pre-established or derived value. For instance, referring to the example tree-like category structure of FIG. 6, with reference number 90, the query-based demand (as measured by the click probability scores) for the two top-level categories is equivalent at thirty. However, at the leaf-level, there is a significant difference between the click probability scores for leaf-level category 1-1-1, and leaf-level category 1-1-2. Specifically, the difference between the two is twenty-four, or twenty-six minus two. Accordingly, sub-category 1-1 would not be a good candidate for inclusion in the identified group as it would include a leaf-level category with relatively low demand (e.g., a click probability score of only two) for the given query. The tree 92 on the right in FIG. 6 is more balanced, and thus, sub-category 2-1 would be a good candidate for inclusion in the group of identified categories, as the difference between the two leaf-level categories is only one.

FIG. 7 illustrates an example formula for deriving a category boost score for item listings assigned to certain categories, based on the click probability score of the category, according to an embodiment of the invention. As illustrated in FIG. 7, the category boost score that is assigned to an item listing associated with one of the identified categories is dependent upon some pre-established maximum number, minimum number, and the click probability score for that particular category. Taking as the minimum and maximum, one and four respectively, the category boost score for an item listing assigned to a category with click probability score of seventy-five percent would be three and one quarter, or 3.25. This category boost score might be used in an algorithm to promote item listings assigned to the particular category, such that the boost score would serve as a weighting factor to increase the overall ranking score assigned to the respective item listings.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 8:
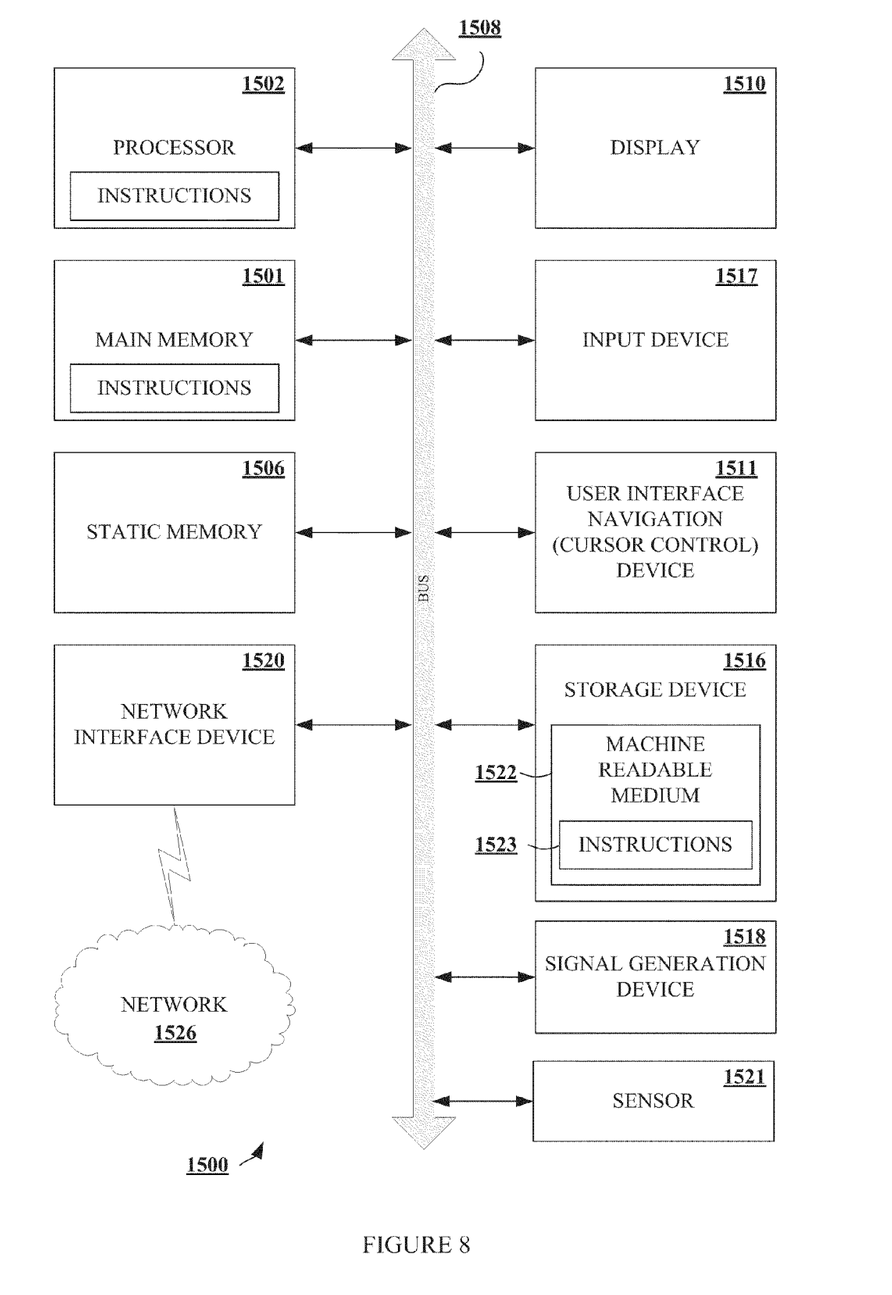
FIG. 8 is a block diagram of a machine in the form of a mobile device within which a set of instructions, for causing the machine to perform any one or more of the methodologies discussed herein, may be executed.

FIG. 8 is a block diagram of a machine in the form of a computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   processing a query to identify, a set of item listings, each item listing associated with an item or service being offered for sale and assigned to a leaf-level category;
   obtaining for the query a click probability score for each leaf-level category to which an item listing satisfying the query has been assigned, the click probability score for a particular leaf-level category derived by dividing a number of clicks for the particular leaf-level category by the total number of clicks for all leaf-level categories to which an item listing satisfying the query has been assigned;
   identifying up to a predetermined number of leaf-level categories with click probability scores exceeding a threshold score;
   for each of the identified leaf-level categories, calculating a category boost score for use in determining the order in which the item listings are to be presented in a search results page; and
   presenting a search results page with the item listings ordered based in part on the category boost score for the leaf-level category, to which each item listing is assigned.

2. The computer-implemented method of claim 1, wherein the threshold score is derived as a percentage of the click probability score of the leaf-level category with the highest click probability score.

3. The computer-implemented method of claim 1, wherein the threshold score is derived by dividing the click probability score of the leaf-level category with the highest click probability score by one less than the predetermined number.

4. The computer-implemented method of claim 1, wherein the category boost score for each identified leaf-level category is derived based in part on the click probability score of each identified leaf-level category.

5. The computer-implemented method of claim 1, wherein the item listings are ordered based on a ranking score derived with an algorithm utilizing the category boost score as a factor.

6. The computer-implemented method of claim 1, wherein the click probability score for each category-represents a probability, for a particular query, that an item listing assigned to the category will be selected from a search results page, the click probability score for each category derived based on analysis of historical click data.

7. The computer-implemented method of claim 1, further comprising:
   determining that the number of leaf-level categories having a click probability score greater than or equal to the threshold score is less than the predetermined number, identifying additional leaf-level categories up to the predetermined number of categories, the additional leaf-level categories having click probability scores equal to or greater than some predetermined percentage of the click probability score of the leaf-level category with the lowest click probability score that is higher than the threshold score.

8. A system comprising:
   a memory device for storing instructions executable by a processor;
   a processor for executing instructions stored in the memory, at least a portion of those instructions representing an item listing presentation management module, which, when executed by the processor, is to process a query to i) identify a set of item listings, each item listing associated with an item or service being offered for sale and assigned to a leaf-level category, ii) obtain for the query a click probability score for each leaf-level category to which an item listing satisfying the query has been assigned, the click probability score for a particular leaf-level category derived by dividing a number of clicks for the particular leaf-level category by the total number of clicks for all leaf-level categories to which an item listing satisfying the query has been assigned, iii) identify up to a predetermined number of leaf-level categories with click probability scores exceeding a threshold score, iv) for each of the identified leaf-level categories, calculate a category boost score for use in determining the order in which the item listings are to be presented in a search results page, and iv) cause a search results page to be presented with the item listings ordered based in part on the category boost score for the leaf-level category to which each item listing is assigned.

9. The system of claim 8, wherein the item listing presentation management module is to derive the threshold score as a percentage of the click probability score of the leaf level category with the highest click probability score.

10. The system of claim 8, wherein the item listing presentation management module is to derive the threshold score, by dividing the click probability score of the leaf-level category with the highest click probability score by one less than the predetermined number.

11. The system of claim 8, wherein the item listing presentation management module is to derive the category boost score for each identified leaf-level category based in part on the click probability score of each identified leaf-level category.

12. The system of claim 8, wherein the item listing presentation management module is to order the item listings based on a ranking score derived with an algorithm utilizing the category boost score as a factor.

13. The system of claim 8, wherein the click probability score for each category represents a probability, for a particular query, that an item listing assigned to the category will be selected from a search results page, the click probability score for each category derived based on analysis of historical click data.

14. The system of claim 8, wherein the item listing presentation management module is to identify additional leaf-level categories up to the predetermined number of categories, the additional leaf-level categories having click probability scores equal to or greater than some predetermined percentage of the click probability score of the leaf-level category with the lowest click probability score that is higher than the threshold score, if the number of leaf-level categories having a click probability score greater than or equal to the threshold score is less than the predetermined number.

* * * * *